Sept. 28, 1965   H. P. KALMUS ETAL   3,208,281
SHORTEST-PATH MECHANICAL WAVE DEPTH GAUGE
Filed April 14, 1964   2 Sheets-Sheet 1
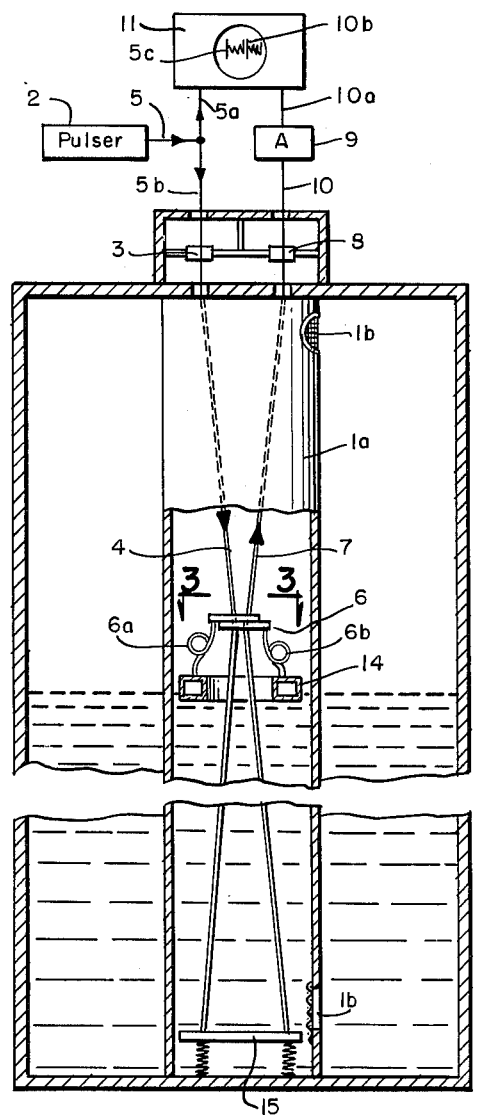
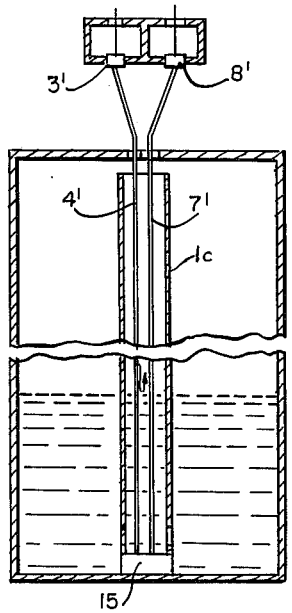
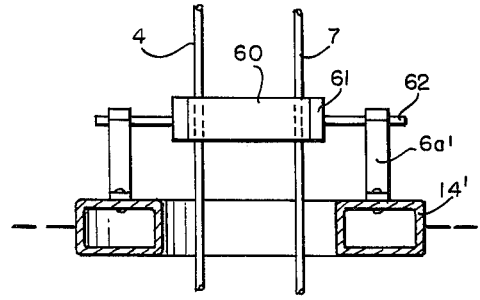
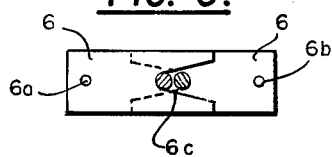
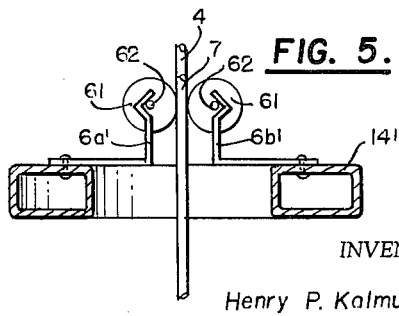
INVENTORS
Henry P. Kalmus
Max L. Libman
BY  *Max L. Libman*
ATTORNEY Sept. 28, 1965     H. P. KALMUS ETAL     3,208,281
SHORTEST-PATH MECHANICAL WAVE DEPTH GAUGE
Filed April 14, 1964     2 Sheets-Sheet 2

INVENTORS
Henry P. Kalmus
Max L. Libman

BY *Max L. Libman*

ATTORNEY

United States Patent Office 3,208,281
Patented Sept. 28, 1965

3,208,281
SHORTEST-PATH MECHANICAL WAVE
DEPTH GAUGE
Henry P. Kalmus, 3000 University Terrace NW., Washington, D.C., and Max L. Libman, Box 112, Rte. 5, Fairfax County, Va.
Filed Apr. 14, 1964, Ser. No. 359,800
3 Claims. (Cl. 73—313)

This invention relates to the measurement of liquid volume in a container, and more specifically to the determination of the depth of liquid in a closed container, and has for its primary object the provision of a system for indicating the liquid level in a closed tank. The invention is particularly adapted for, but not limited to, measurement of highly inflammable fluid such as gasoline in large tanks such as the storage tanks of fuel tankers which are used for transporting such liquids.

Due to the highly inflammable nature of liquid fuels such as gasoline, fuel oil, and so forth, no devices are permitted inside of the tanks used in transporting these materials, which might in their operation tend to produce electric sparks, or to produce dangers temperatures in the event of malfunction of the equipment. For this reason, it is highly undesirable to use electrical measuring equipment or any electrical wiring within the tank, and in fact, the use of electrical equipment is generally forbidden in such circumstances. Various attempts have been made to use mechanical reflected wave energy for this purpose, as exemplified for example by the patent to Junger, No. 3,100,994, but this requires both special transducers and special wave transmitting elements of expensive construction, and also has inherent problems in separating the returning echo pulses from the incident transmitted pulses, thus limiting the inherent accuracy of the system. Where air or fluid transmission of acoustic energy is employed, temperature effects also complicate the picture, since the transmission velocity in non-solids is dependent on temperature and vapor pressure, etc., while a metallic path is substantially independent of these effects.

In accordance with the present invention, two separate paths in the form of non-resonant, metallic, signal conductors are provided, one for the transmission of the mechanical impulses from a transducer to the surface of the fluid to be measured, and the other for the separate transmission of mechanical impulses from the surface of the fluid to a second transducer. The time of transmission of a pulse having very high-frequency components from the first transducer down the first path to the surface of the liquid, and from the surface of the liquid to the second transducer, is then measured as an indication of the liquid level in the tank. Special means are also provided for indicating this time as a digital value which may be directly related to the volume of fluid in the tank.

The specific nature of our invention as well as other objects and advantages thereof will clearly appear from a description of a preferred embodiment, as shown in the accompanying drawings, in which:

FIG. 1 is a schematic diagram showing the principle of one form of the invention;

FIG. 2 is a schematic diagram showing the principle of another form of the invention;

FIG. 3 shows details of a float-carried bridging element for transmitting pulses from the sending path to the receiving path;

FIGS. 4 and 5 are front and side views respectively of an alternative form of bridging element;

Figure 6:
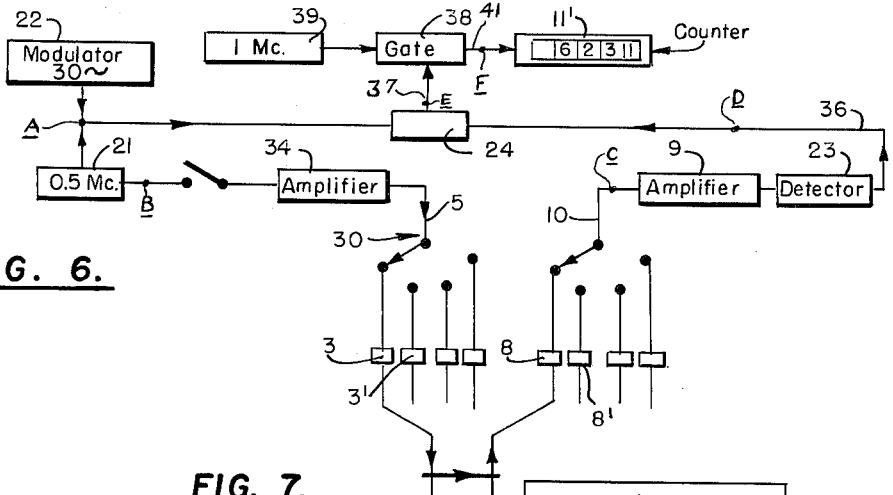
FIG. 6 is a block diagram of a schematic layout for selectively measuring the liquid level of a number of different tanks.

Referring to FIG. 1, an electrical pulser 2, which may be of any conventional design, is employed to produce signals on line 5 at a suitable repetition rate, for example, 30 per second. Each of these signals is transmitted along line 5a to oscilloscope 11, so as to produce an initial pulse 5c at the beginning of the oscilloscope sweep, for reference purposes. The same electrical signals are also transmitted on line 5b to transducer 3, where they are converted into mechanical vibrations of substantially the same time duration. Mechanically connected to transducer 3 so as to receive mechanical vibrations therefrom, is a vibration conductor 4, which is preferably in the from of a thin wire, although a thin tape, or any other suitable cross-section may be used. The mechanical signals travel down conductor 4 at a definite speed, depending upon the material of the conductor. A suitable material for this purpose has been found to be Phosphor bronze, in which the mechanical wave travels at approximately 15,000 feet per second. A similar conductor 7 is arranged to receive the mechanical signals from line 4 as will be explained later, and conductor 7 is connected to a transducer 8, where the arriving signals from line 7 are reconverted into electrical signals on line 10, which signals are suitably amplified in amplifier 9, and also transmitted on line 10a to oscilloscope 11 where they are indicated as pulse 10b, spaced from initiating pulse on line 5a by a distance which corresponds to the distance which the mechanical pulse has travelled along conductors 4 and 7, the time of transmission of the electrical impulses being negligible in comparison.

One way of transferring the signals from conductor 4 to conductor 7 is by means of float 14 which floats on the surface of the liquid in the tank 1. This float is shown as annular in shape, and in any event must be of such construction as not to touch or interfere with the conductors 4 and 7. Attached to the float are a pair of bridging elements 6, which are urged by means of two springs 6a and 6b toward each other. The bridging elements are provided with notches as indicated at 6c (see FIG. 3) so as to press the two conductors 4 and 7 into contact at a point which varies with the depth of liquid in the tank. With the arrangement described, the conductor 4 is excited longitudinally, and it has been found that the conductor 7 can be efficiently coupled thereto in the manner shown, whereby the two conductors are substantially parallel at the point of contact; conversely, if conductor 7 contacts conductor 4 substantially at right angles, very little transmission of the pulse is noted. Pinching elements 6 are preferably made of a material which does not efficiently couple mechanically to the conductors 4 and 7 so as not to absorb much of the vibration from them. It has been found that a light plastic such as polyethylene or nylon serves very well for this purpose. If desired, a protective tubular inner housing 1a, open at top and bottom as shown at 16 may be used to protect the conductors and the float.

FIGS. 3 and 4 shows alternative bridging devices wherein a separate bridging element is used to mechanically couple the two conductors for transmission of pulses from one to the other. In practice, almost any light mechanical bridging element will serve to produce a measurable pulse at 10b, but the efficiency of transmission is somewhat greater with the arrangement of FIG. 1. Conductors 4 and 7 may be suitably fastened to the bottom of the tank in any desired manner so as to maintain a small but distinct separation between them. They are preferably coupled in a wave-absorbing manner to a base element 15 which in turn may be tied to the bottom of the tank under tension as by springs 15a in order to maintain a constant tension upon the conductors 4 and 7 despite any dimensional changes due to thermal expansion or contraction. This may be of practical importance because the tanks, which are made of metal, are often in excess of 50 feet in depth.

FIG. 2 shows an alternative arrangement in which the transducer elements 3 and 8 are again coupled to conductors 4' and 7' as before; however, in this case a float and bridging element are not used, transmission being directly through the liquid from one conductor to the other. Since the efficiency of this transmission is very much less than when a bridging element is used, much more sensitive and sophisticated measuring equipment must be used to detect the returned signal, and all available means should be employed to make the mechanical coupling between the conductors and the fluid as great as possible, for example, using tapes of greater area than wires, and furthermore, the two conductors should be spaced as close together as is feasible without danger of their actually touching.

As a further aid in improving the efficiency, the two conductors 4' and 7' may be in the form of two thin filaments, spaced about $\frac{1}{16}$ inch apart, at the center of a tubular reflector 1c, which serves to reflect and concentrate the vibrations transmitted from wire 4' through the fluid (at or near the surface) back to the wire 7'. Ideally, the tube 1c should be elliptical with the two filaments at their respective focii of the ellipse, but with the two filaments so closely spaced, a circular cross-section provides a reasonable approximation of the elliptical condition. The advantage of the arrangement of FIG. 2 is that no mechanical float is required, and in practice, measurable pulses have been received, but at the disadvantage of requiring much more sensitive measuring apparatus, and much more careful spacing of the conductors.

As shown in FIGS. 4 and 5, instead of pinching the two filaments 4 and 7 together, the signals can be conducted from filament 4 to filament 7 by means of a bridging conductor carried by the float 14'. In this case the bridging conductor is in the form of a thin metal tube 60 carried on a roller 61 of a lightweight material such as plastic, which will not absorb much of the mechanical vibrations. It will be understood that a heavy metallic mass would tend to absorb the vibrations and not transmit them effectively, therefore the actual transmitting bridging element 6' is made of light and thin sheet metal such as Phosphor bronze. It is desirable to employ rolling contact as shown, and therefore it is preferable to employ two such rollers which are pressed toward each other by means of springs 6a' and 6b' with sufficient force to insure good contact. It has been found that a sliding contact tends to produce high-frequency mechanical vibrations in the filaments, which appear as noise in the receiving transducer 8 and make it more difficult to distinguish the desired signal. It will be noted that the pinching arrangement of FIG. 1 also avoids sliding contact of metal on metal.

In practice, the return signal 10b can always be identified because it is the first pulse to appear after the initial signal 5a, since it takes the shortest path. However, there will also be additional pulses due to reflection from the ends of the conductors 4 and 7, to transmission through the fluid, and so forth. In prior art systems where the same path was used both for transmission and return, it has been very difficult to adequately separate these spurious pulses from the significant return signal which indicates the liquid level. However, in the present arrangement, it is not even necessary that the pulse 10b be the greatest return pulse received, provided it is large enough to be clearly distinguishable over noise and therefore measurable. The subsequent reflection pulses may even in some cases, due to reinforcement effects, be larger than the initial signal pulse, but they can be easily distinguished because of the fact that they always occur later in time. This is particularly true of the arrangement of FIG. 2, where the signals transmitted via the surface of the liquid provide the first indication, and therefore are a measure of the liquid level, while other signals transmitted from other portions of the liquid can be distinguished because they arrive later in time.

FIG. 6 shows an arrangement for use on shipboard, to measure successively the liquid contents of a number of tanks on the ship, which may in practice be as many as thirty tanks. A transfer switch 30 is used to connect the detection system successively to transducers 3, 8, 3', and 8', and so forth, each set of transducers being similar to those shown in FIG. 1 or FIG. 2, and each associated with a separate tank. In order to improve the efficiency of detection, the transmitted pulse is preferably a burst of high-frequency pulses, for example, at a frequency of 0.5 megacycle. This frequency is produced, for example, by generator 21, and is modulated by modulator 22, which may be a non-symmetric astable multivibrator having a relaxation time such as to provide the desired short modulated bursts of a suitable width, for example 20 microseconds, as shown at B in FIG. 8. These are amplified in amplifier 34, and transmitted on line 5 to transducer 3, as previously described. The return pulse on filament 7 is received at transducer 8 and transmitted on line 10 as before to amplifier 9, and the amplified pulse is then demodulated by a suitable detector 23 to produce on line 36 a pulse envelope as shown at D in FIG. 8. This pulse is transmitted to bistable multivibrator 24, which was previously turned on by the initial pulse on line 5' to provide a signal on line 37 to open gate 38, which permitted high-frequency pulses from generator 39, for example at a frequency of 1 megacycle, to be transmitted on line 41 for digital display by pulse counter 11', corresponding to oscilloscope 11 in FIG. 1. When the return pulse on line 37 reaches gate 38, it shuts the gate off, and therefore the total number of pulses registered at 11' is an indication of the time required for the mechanical pulses to travel down filament 4 and up filament 7 from the surface of the liquid, and is therefore indication of the depth of the liquid in the tank. In practice, it is preferred to have the entire operation repeated a number of times, for example 100 times in succession, which can be done by a suitable counter built into commercially available digital registers 11', so that the total registration represents the value of 100 separate measurements, which can then be averaged out simply by stepping over the numerical reading by two decimal places. The numerical value shown on the register 11' must, of course, be related to each individual tank, which can be done by suitable advance calibration. In a situation where all the tanks are of the same size, values of pulse duration, etc., can be so selected that the numerical reading directly indicates the desired quantity. A suitable chart of a simple analog computing device can be employed if desired to transform the numerical reading into a direct reading of the contents of each tank.

Figure 7:
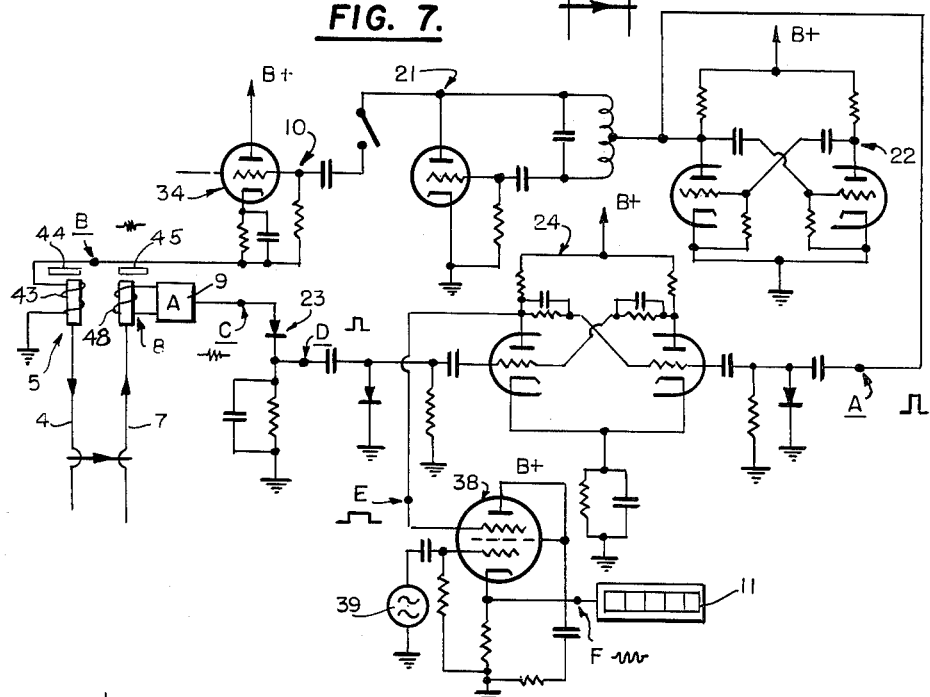
FIG. 7 is a schematic circuit diagram showing in more detail the circuit components of FIG. 6.

FIG. 7 shows in more detail suitable electronic circuitry for the system of FIG. 6. Corresponding circuit elements are indicated by the same reference characters as in FIG. 6, and the particular electronic circuits shown are given only by way of example, as the design of such circuit components is within the skill of any competent circuit designer. The particular transducers shown at 3 and 8 in FIG. 7 are ferrite transducers having relatively low-impedance windings 43 and 48, and adjustable by fixed magnets 44 and 45, but ceramic transducers are also available and may be used, the input and output circuits being appropriately matched for the impedance of the type of transducer being employed.

Figure 8:
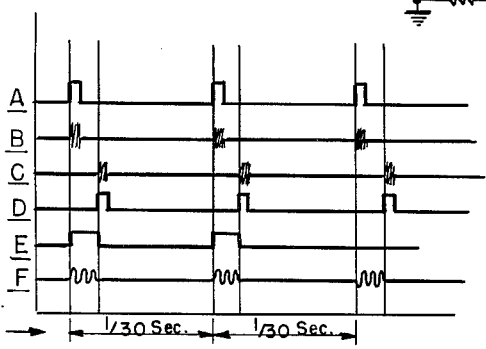
FIG. 8 is a pulse-time chart showing the time relationship of the various pulses employed in the system.

FIG. 8 shows the pulse-time relationships of the pulses employed, which are identified by capital letters A–F, and the particular portion of the circuit in FIG. 7 where each pulse appears is also identified by the same capital letters in order to make it readily apparent what the timing relationships are that exist between the pulses carried by the various portions of the circuit.

In order to meet commerical and practical requirements, it is desirable to be able to measure the surface level of the liquid in a typical ship's tank, which may be 30 feet deep, to an accuracy of ½ inch. Prior art methods employing relatively low frequencies in the audio-frequency range, e.g., up to approximately 50,000 cycles per second, cannot achieve this level of accuracy, because with a frequency of 50,000 cycles per second, and with a typical metallic wave conductor (in which the maximum velocity of propagation is about 15,000 feet per second), it will be apparent that the wave length is approximately four inches, and in order to determine the distance to the point of reflection, it would be necessary to measure accurately not only the number of cycles, but also the phase of the received wave. In the present invention, this difficulty is overcome by employing as the basic signal carrier a very high frequency, e.g., in the order of a megacycle (or at least ½ mc.), and impressing the detected signal as a lower frequency modulation of the basic high frequency. In this way, mechanical signal pulses are produced and detected which have a very steep and sharply delineated front which can be very accurately resolved to locate the desired surface to within a fraction of an inch. Since mechanical wave conductors of feasible size cannot ordinarly resonate at these high frequencies, the present invention employs, in effect, very broad-band, non-resonant mechanical wave transmission along a metal wave conductor, preferably of low mass. For this purpose a thin metal filament is well suited, although it may also be a thin metal tape. This wave conductor is then forced to conduct bursts or "blocks" of high-frequency signals (e.g., at 0.5 mc.) at a low-frequency rate for the bursts (e.g., 30 cycles per second). The detector 23 rectifies these high frequency signals to produce a signal envelope (as shown at D in FIG. 8) which has a sharp leading edge which accurately defines the time interval being measured. It will be understood that instead of longitudinal vibrations, torsional vibrations could also be used, which travel at a lower rate of speed, but is generally simpler to produce longitudinal vibrations in a practical apparatus.

It will be apparent that the embodiments shown are only exemplary and that various modifications can be made in construction and arrangement within the scope of our invention as defined in the appended claims.

We claim:

1. Means for determining the depth of fluid in a tank comprising:

(a) two high-frequency electromechanical transducers mounted a fixed distance above the highest level of fluid in the tank;
(b) two non-resonant elongated solid wave conductors each connected at one end to one of said transmitters for the non-resonant propagation of mechanical impulses to and from the respective transducers over a wide range of frequencies;
(c) said wave conductors extending in side-by-side relationship from above the highest level of fluid in the tank into the fluid to be measured;
(d) means for electrically exciting one of said transducers with a first signal burst including components of electrical energy at a very high frequency, and thereby transmitting a mechanical signal along the wave conductor connected to said one transducer, float means at the surface of fluid in said tank for transmitting said mechanical signal to the other solid wave conductor to excite its connected transducer to produce a received electrical signal therein containing said high-frequency components;
(e) means for rectifying said high-frequency components of the received signal to produce a received signal having a sharp leading edge;
(f) and means for measuring the time interval between said first signal and said received signal as an indication of the fluid depth in the tank;
(g) said float means including solid wave-conductive means in physical contact with both of said wave conductors for transmitting said mechanical signals from one of said conductors to the other.

2. The invention according to claim 1, said solid wave-conducting means comprising means for pressing said wave conductors into contact at a limited area adjacent the float.

3. The invention according to claim 1, said solid wave-conductive means comprising bridging roller-means carried by said float for rolling contact with both of said wave conductors as the level of the float changes.

References Cited by the Examiner

UNITED STATES PATENTS

| 2,753,542 | 7/56 | Rod et al. | 73—290 X |
| 3,080,752 | 3/63 | Rich | 73—290 |
| 3,133,442 | 5/64 | Werner | 73—290 |

FOREIGN PATENTS 1,126,419   7/56   France.

LOUIS R. PRINCE, *Primary Examiner.*